(12) United States Patent
Bush et al.

(10) Patent No.: US 9,178,897 B2
(45) Date of Patent: Nov. 3, 2015

(54) METHODS AND SYSTEMS FOR USE IN IDENTIFYING CYBER-SECURITY THREATS IN AN AVIATION PLATFORM

(75) Inventors: John Eric Bush, Bothell, WA (US);
Arun Ayyagari, Seattle, WA (US);
Winfeng Li, Renton, WA (US); Shawn W. Lorimer, Spanaway, WA (US);
Matthew L. Benson, Seattle, WA (US);
Steven J. Bates, Tacoma, WA (US);
John A. Craig, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/540,955

(22) Filed: Jul. 3, 2012

(65) Prior Publication Data

US 2014/0013431 A1    Jan. 9, 2014

(51) Int. Cl.
*G06F 21/00* (2013.01)
*H04L 29/06* (2006.01)
*G06F 21/55* (2013.01)

(52) U.S. Cl.
CPC ............ *H04L 63/1408* (2013.01); *G06F 21/00* (2013.01); *G06F 21/55* (2013.01); *G06F 2221/2101* (2013.01)

(58) Field of Classification Search
USPC ................. 726/23, 25–26, 32, 34; 709/224
See application file for complete search history.

(56) References Cited

U.S. PATENT DOCUMENTS

| | | | |
|---|---|---|---|
| 7,096,502 B1* | 8/2006 | Fox et al. | 726/25 |
| 7,307,578 B2 | 12/2007 | Blaskovich et al. | |
| 7,522,088 B2 | 4/2009 | Barry et al. | |
| 7,609,156 B2 | 10/2009 | Mullen | |
| 7,876,258 B2 | 1/2011 | Abraham et al. | |
| 7,908,045 B1 | 3/2011 | McCuscker | |
| 7,908,645 B2 | 3/2011 | Varghese et al. | |
| 8,019,491 B1 | 9/2011 | McCusker | |
| 8,058,990 B2 | 11/2011 | Mullen | |
| 2005/0044418 A1 | 2/2005 | Miliefsky | |
| 2005/0050351 A1* | 3/2005 | Cain | 713/201 |
| 2006/0161979 A1* | 7/2006 | Pandey et al. | 726/22 |
| 2006/0191007 A1 | 8/2006 | Thielamay | |
| 2007/0016955 A1* | 1/2007 | Goldberg et al. | 726/25 |
| 2007/0192867 A1* | 8/2007 | Miliefsky | 726/25 |
| 2007/0273497 A1 | 11/2007 | Kuroda et al. | |
| 2008/0005555 A1* | 1/2008 | Lotem et al. | 713/150 |
| 2008/0234979 A1* | 9/2008 | Costiner et al. | 702/184 |

(Continued)

FOREIGN PATENT DOCUMENTS

WO      0070463      11/2000

OTHER PUBLICATIONS

International Search Report and Written Opinion of International Application No. PCT/US2013/042283; Aug. 7, 2013; 9 pages.
Extended European Search Report of Application No. 14172373.4; Dec. 9, 2014; 7 pages.

(Continued)

*Primary Examiner* — Joseph P Hirl
*Assistant Examiner* — Kalish Bell
(74) *Attorney, Agent, or Firm* — Armstrong Teasdale LLP

(57) ABSTRACT

Methods and apparatus for use in identifying cyber-security threats for an aircraft are provided. The method includes storing parts information relating to each hardware and software component used on the aircraft in an aircraft parts database, receiving, by a computing device, a cyber-security threat, and determining, by the computing device, a threat is relevant to the aircraft by comparing the received threats to the stored parts information.

20 Claims, 4 Drawing Sheets

(56) References Cited

U.S. PATENT DOCUMENTS

| | | | |
|---|---|---|---|
| 2009/0167567 A1* | 7/2009 | Halperin et al. | 340/961 |
| 2011/0119765 A1* | 5/2011 | Hering et al. | 726/25 |
| 2013/0080042 A1* | 3/2013 | Estkowski et al. | 701/120 |

OTHER PUBLICATIONS

Hahn, A. et al.; Smart Grid Cybersecurity Exposure Analysis and Evaluation Framework; 2010 IEEE Power and Energy Society General Meeting; Jul. 25-29, 2010; Minneapolis, MN; 6 pages.

* cited by examiner

METHODS AND SYSTEMS FOR USE IN IDENTIFYING CYBER-SECURITY THREATS IN AN AVIATION PLATFORM

BACKGROUND

The field of the disclosure relates generally to cyber-security, and, more specifically, to methods and systems for use in identifying cyber-security threats in aviation platforms.

At least some known aviation platforms and infrastructures have adopted e-Enabled architectures and technologies to take advantage of operational and performance efficiencies that result from being networked. Aviation platforms and infrastructures are complex systems that involve hierarchically-networked embedded systems and controllers with varying operational criticality, reliability, and availability requirements as aviation platforms and infrastructures, both onboard and off-board aircrafts, have become e-enabled, they may be the targets of cyber-security threats.

Generally, within at least some known platforms, the embedded systems and controllers are hosted on general purpose computing devices, commercial software operating systems, and specific custom applications performing intended system functions. Onboard embedded systems and controllers are networked via standards-based protocols to enable seamless integration of the e-Enabled architecture. However, such integration may also be the target of cyber-security attacks.

The hierarchical nature of the embedded systems and controllers implies that cyber-security threats cannot be viewed individually as they apply to a single system or controller, but rather such threats must generally be viewed as a collection of cyber-security threats due to the hierarchical nature of the computing systems. As such, a need exists for a comprehensive application service that can use published and potentially emerging cyber-security threats to evaluate their impact on targeted e-Enabled aviation platforms and infrastructure.

BRIEF DESCRIPTION

In one aspect, a method for use in identifying cyber-security threats for an aircraft is provided. The method includes storing parts information relating to at least some hardware and software components used on the aircraft, receiving, by a computing device, a cyber-security threat, and determining, by the computing device, that a threat is relevant to the aircraft by comparing the received threats to the stored parts information.

In another aspect, system for use in identifying cyber-security threats for an aircraft is provided. The system includes a storage device configured to store part information relating to at least some hardware and software component used on the aircraft, a communications unit configured to receive at least one cyber-security threat, and a processor unit coupled to said storage device and said communications unit, wherein said processor unit is programmed to determine if a threat is relevant to the aircraft by comparing a threat received by said communications unit to at least one part information stored in said storage device.

In yet another aspect, one or more computer readable media having computer-executable components are provided. The components include a communications component and a threat determination component. When executed by at least one processor unit, the communications component causes the at least one processor unit to receive a cyber-security threat and store part information relating to at least one hardware and software component used on an aircraft. The threat determination component causes the at least one processor unit to determine a threat is relevant to the aircraft by comparing a threat received to at least one part information.

The features, functions, and advantages that have been discussed can be achieved independently in various embodiments or may be combined in yet other embodiments further details of which can be seen with reference to the following description and drawings.

DETAILED DESCRIPTION

The embodiments described herein are directed to methods and systems for use in identifying cyber-security threats in aviation platforms. As used herein, the term "aviation platform" refers to a hardware architecture (hardware components) and a software framework (software components), including application frameworks, that enable software, particularly application software, to operate an aircraft. As used herein, the term "cyber-security threat" refers to any circumstance or event having the potential to adversely impact an asset (e.g., an aircraft, an aircraft component) through unauthorized access, destruction, disclosure, modification of data, and/or denial of service. Embodiments are described herein with reference to computing devices. As used herein, a computing device may include an end-user device and/or an embedded device that is configured to identify cyber-security threats in an aviation platform.

Figure 1:
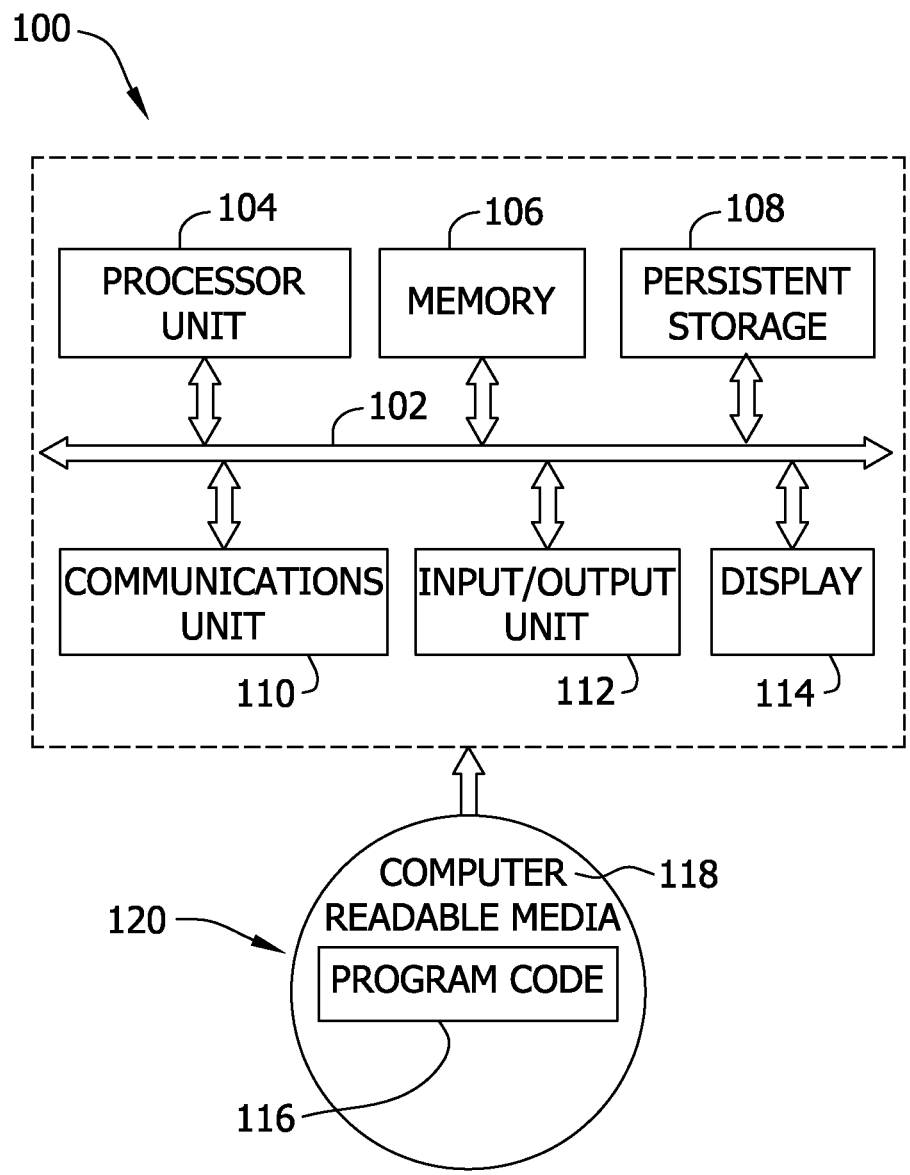
FIG. 1 is a block diagram of an exemplary computing device that may be used to identify cyber-security threats.

FIG. 1 is a block diagram of an exemplary computing device 100 that may be used to identify cyber-security threats. In the exemplary embodiment, computing device 100 includes a communications fabric 102 that enables communications between a processor unit 104, a memory 106, persistent storage 108, a communications unit 110, an input/output (I/O) unit 112, and a presentation interface, such as a display 114. In addition to, or in the alternative, the presentation interface may include an audio device (not shown) and/or any device capable of conveying information to a user.

Processor unit 104 executes instructions for software that may be loaded into memory 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another embodiment, processor unit 104 may be a homogeneous processor system containing multiple processors of the same type.

Memory 106 and persistent storage 108 are examples of storage devices. As used herein, a storage device is any piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store computer-executable instructions, executable software components (e.g., communications components, threat determination components, threat relevancy components, threat prioritization components, and threat evaluation components), data received from data sources, aircraft information, hardware and/or software component information, business descriptions associated with hardware and/or software components, safety information hardware and/or software components, threat tree models, and/or any other information suitable for use with the methods described herein.

Communications unit 110, in these examples, enables communications with other computing devices or systems. In the exemplary embodiment, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to computing device 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computing device 100. The tangible form of computer readable media 118 is also referred to as computer recordable storage media. In some instances, computer readable media 118 may not be removable.

Alternatively, program code 116 may be transferred to computing device 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another computing device or computer system for use within computing device 100. For instance, program code stored in a computer readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include an event processor component, a complex event processing component, a machine learning component, a decision support component, and/or any component suitable for the methods described herein. Each component may include computer-executable instructions that, when executed by processor unit 104, cause processor unit 104 to perform one or more of the operations described herein.

The different components illustrated herein for computing device 100 are not architectural limitations to the manner in which different embodiments may be implemented. Rather, the different illustrative embodiments may be implemented in a computer system including components in addition to or in place of those illustrated for computing device 100. For example, other components shown in FIG. 1 can be varied from the illustrative examples shown.

In one example, a storage device in computing device 100 is any hardware apparatus that may store data. Memory 106, persistent storage 108 and computer readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
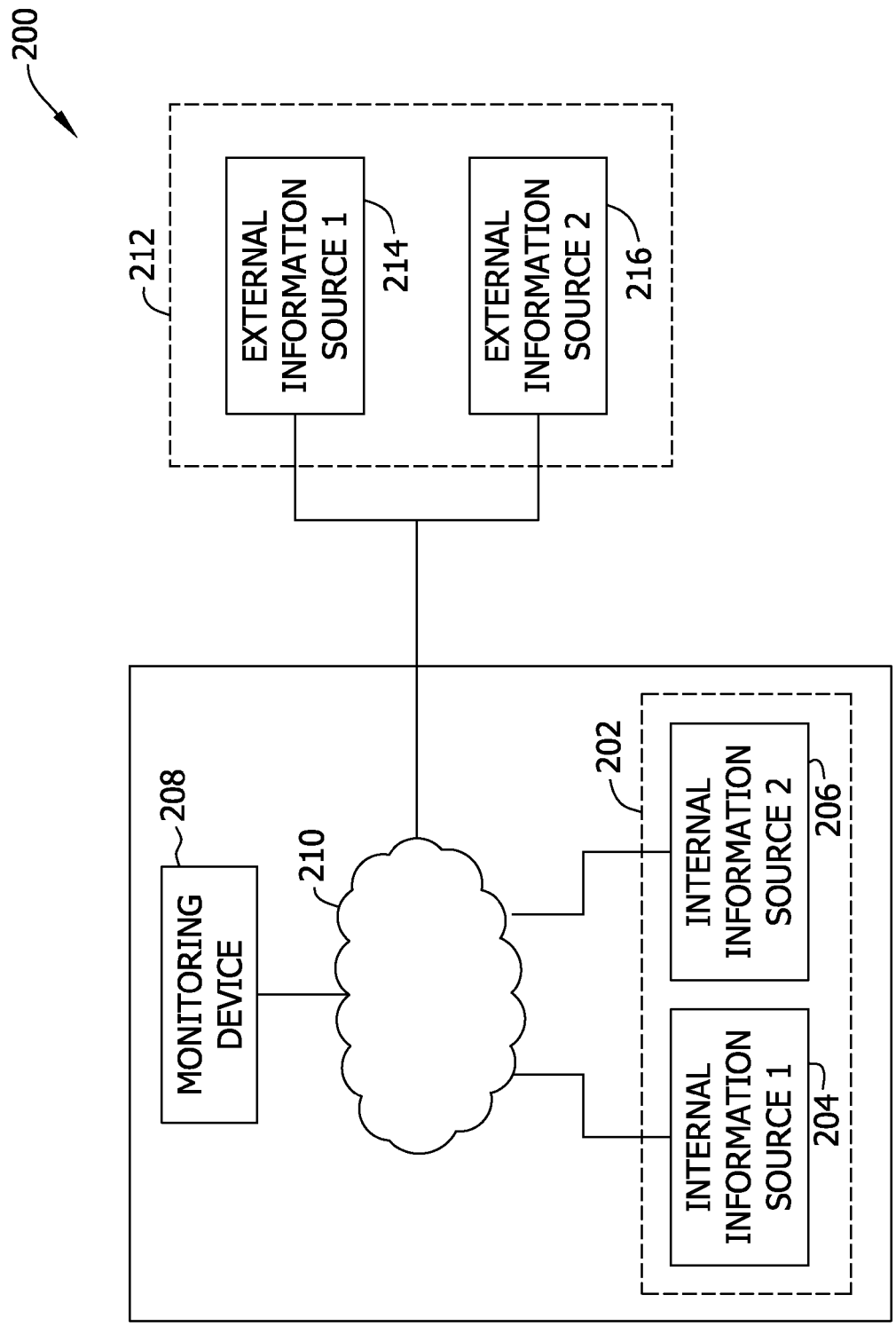
FIG. 2 is a block diagram illustrating an exemplary system that may be used to identify cyber-security threats in an aviation platform.

FIG. 2 is a block diagram of an exemplary threat evaluation system 200 for use in identifying cyber-security threats in aviation platforms. In the exemplary embodiment, threat evaluation system 200 includes internal information sources 202, such as a first internal information source 204, a second internal information source 206, and a monitoring device 208, that are each coupled in communication via a network 210. Also coupled to monitoring device 208 via network 210 are external information sources 212, such as a first external information source 214 and a second external information source 216. Internal information sources 202, external information sources 212, and monitoring device 208 may be separate examples of computing device 100 (shown in FIG. 1) and/or may be integrated with each other.

Internal information sources 202 and external information sources 202 may include, without limitation, web servers, application servers, database servers, web service providers, Really Simple Syndication (RSS) feed servers, and/or any provider of data that may be used with the methods described herein.

In some embodiments, monitoring device 208 is a gateway that facilitates communication among and between internal information sources 202 and external information sources 212. In such an embodiment, monitoring device 208 receives from an external information source 212 data to be stored in internal information source 202. Monitoring device 208 receives the data and stores such data in the appropriate internal information source 202.

Figure 3:
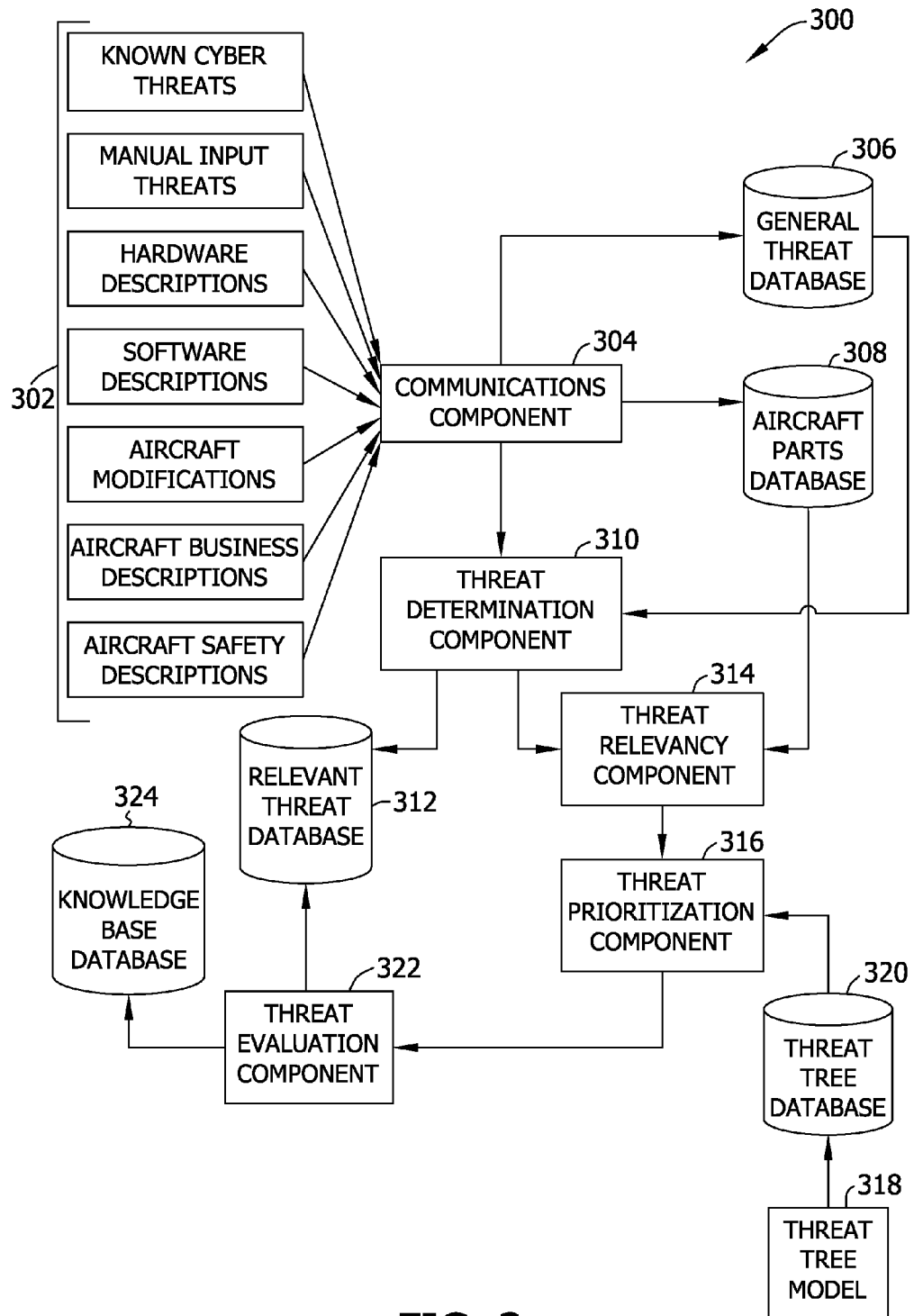
FIG. 3 is a block diagram illustrating exemplary executable components that may be used with the system shown in FIG. 2.
Figure 4:
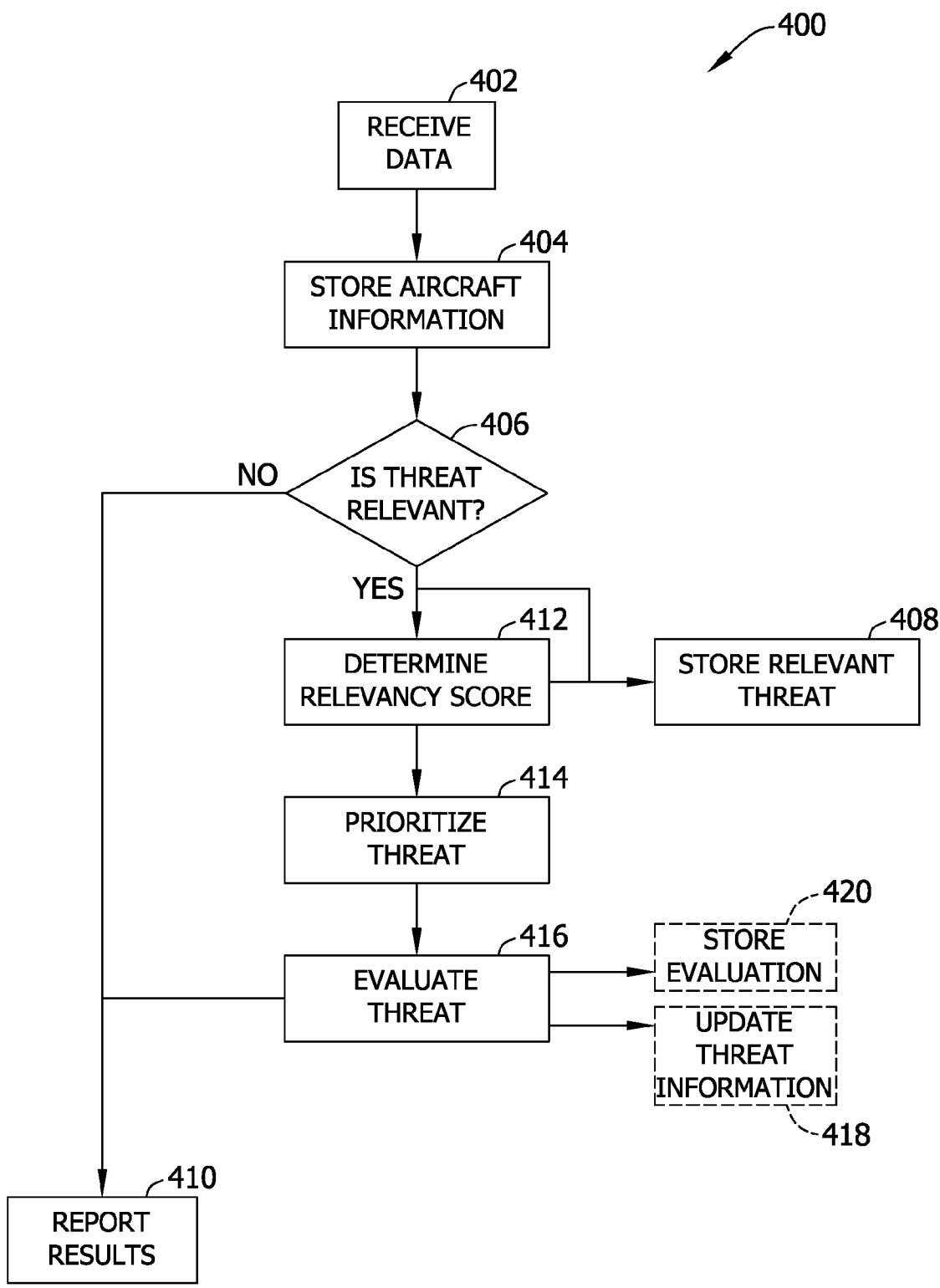
FIG. 4 is a flowchart of an exemplary method that may be used with the system shown in FIG. 2 to indentify cyber-security threats in aviation platforms.

FIG. 3 is a block diagram 300 illustrating executable components that may be used with system 200 (shown in FIG. 2). FIG. 4 is a flowchart of an exemplary method 400 that may be used with system 200. In exemplary embodiments, one or more operations included in method 400 are performed by a computing device 100 (shown in FIG. 1), such as monitoring device 208.

Referring to FIGS. 2, 3, and 4, in exemplary embodiments, method 400 facilitates identifying cyber-security threats in aviation platforms utilizing components in diagram 300 via system 200. In the exemplary embodiment, aircraft data 302 is received 402 via communications component 304. Data 302 can be received 402 from any location such as internal information sources 202 and/or external information sources 212. In the exemplary embodiment, data 302 includes cyber-security threats, hardware and software descriptions, aircraft modifications, aircraft business descriptions, and aircraft safety descriptions.

In the exemplary embodiment, cyber-security threats can include hardware and software threats and/or vulnerabilities. Such threats can be received from any source retaining relevant threat data including, but not limited to The Common Vulnerabilities and Exposures List (CVE), The National Institute of Standards and Technology (NIST), The European Network and Information Security Agency (ENISA), and MITRE. The threats can be known security threats and/or threats that are received from manual input. In one embodiment, the threats include information about the hardware/software versions and/or configurations affected.

In the exemplary embodiment, hardware descriptions include information associated with hardware installed and/or utilized on a particular aviation platform or aircraft. Hardware descriptions include, but are not limited to, processor types, memory, network interfaces, peripherals, and other HCI (human computer interfaces) components. Software descriptions include descriptions of all operation systems and applications on the installed and/or utilized hardware. Software descriptions, include but are not limited to, application names, application versions, and application configurations. In the exemplary embodiment, aircraft modifications include changes (e.g., hardware and/or software) made to an originally manufactured aircraft. Aircraft modifications can include service bulletins including recommendations of changes and/or modifications to original aircraft equipment.

In the exemplary embodiment, aircraft business descriptions refer to costs (e.g., monetary, human capital) associated with rectifying a failure of a hardware and/or a software component installed on an aircraft, as it relates to a business unit associated with the aircraft. Likewise, aircraft safety descriptions refer to the safety implications (e.g., failure of an engine, failure of landing equipment) associated with failure of a hardware and/or a software component installed on an aircraft.

In the exemplary embodiment, data 302 received 402 by component 304 is stored 404 in appropriate locations. In one embodiment, cyber-security threats are stored 404 in a general threats database 306. Alternatively, threats received 402 can be utilized without being stored. In one embodiment, hardware and software descriptions, aircraft modifications, aircraft business descriptions, and aircraft safety descriptions are stored 404 in an aircraft parts database 308.

In the exemplary embodiment, a threat determination component 310 determines 406 if a threat is relevant to an aircraft by comparing the received 402 threats 302 to parts information data 302 stored 404 in parts database 308. If a threat is determined 406 to be relevant, the threat is stored 408 in a relevant threat database 312. For example, a threat could be received 402 that indicates a vulnerability exists with a LINUX operating system. Threat determination component 310 would search the software descriptions stored in database 308 to determine if LINUX is utilized on a particular aircraft. If component 310 determines 406 that LINUX is being utilized, the threat is determined to be relevant and is stored in database 312. Likewise, if a threat relating to a vulnerability with a Windows® operating system is received 402 and component 310 determines that Windows® is not being utilized anywhere on the aircraft, the results could be reported 410 that the particular threat is not relevant to the particular aircraft. Results can be reported 410 in any manner that facilitates identifying threats including utilizing any one of communications component 100, input/output unit 112, and display 114 of computing device 100 shown in FIG. 1.

In the exemplary embodiment, when threats are determined 406 to be relevant to an aircraft, a threat relevancy component 314 determines 412 a threat relevancy score for the threats determined 406 to be relevant. In the exemplary embodiment, a relevancy score is determined 412 by comparing the threat to the safety and business descriptions to determine a safety impact and/or a business impact. In one embodiment, these impacts enable component 314 to assign a severity level of the threat such as, but not limited to, the table shown below.

| Level | Failure Condition |
| --- | --- |
| A | Catastrophic |
| B | Hazardous |
| C | Major |
| D | Minor |
| E | No Effect |

It should be noted that for a safety impact, the more critical of the failure conditions, the higher the relevancy. Likewise, for a business impact, the higher the impact on a business case, the higher the more relevant the threat is.

In the exemplary embodiment, a threat prioritization component 316 is utilized to prioritize 414 a threat by comparing the threats determined 406 to be relevant to a threat tree model 318 stored on a threat tree database 320. In the exemplary embodiment, threat tree model 318 may be a model of how each software component and hardware component is connected together in each aircraft. Model 318 includes a connectivity graph between software components as well as the network topology information of the hardware components on each aircraft. In one embodiment, utilizing model 318 enables a determination to be made as to where threat vectors may enter and where they may propagate inside an aircraft's e-Enabled systems.

Additionally model 318 enables system 200 to evaluate if combinations of threats could be used together to traverse an aircraft's e-Enabled network hierarchy and compromise the aircraft systems. For example, model 318 could show that a wind sensor is self-contained in a monitoring subsystem that does not integrate into the overall aircraft system. Using such a model would allow component 316 to prioritize 414 a threat associated with the wind sensor low as the threat could not propagate into the main aircraft system because the sensor was self-contained in monitoring subsystem. Alternatively, the more systems and networks required in a threat's path could result in a lower prioritization 414 because there are more systems that would need to be compromised. Likewise, a threat with direct access to a targeted system could have a higher prioritization because there are fewer systems that would need to be compromised.

In the exemplary embodiment, a threat evaluation component 322 is utilized to analyze and/or determine 416 a threat's impact on an aircraft. The analysis 416 of threats enables system 200 to confirm or deny a threat's relevance and/or impact. For example, a threat could be received for a Windows® operating system that was determined 406 to be relevant to the aircraft. Upon evaluation 416, it could be determined that the vulnerability in the threat is associated with a process that is never utilized on the aircraft. Therefore, the threat would be deemed to not be relevant. After an evaluation 416, component 322 can update 418 any information in systems 200 and 300 including, but not limited to, relevancy determinations 406, score determinations 412, priority determinations 414, business and safety descriptions 302, hardware and software descriptions 302, and threat tree models 318. Additionally, component 322 is programmed to store 420 threat evaluation 416 information into a knowledge base database 324 and/or report results 410.

In exemplary embodiments, monitoring device 208 executes method 400 repeatedly (e.g., periodically, continually, or upon request) to provide ongoing monitoring of cyber-security threats. It should be noted that databases 306, 308, 312, 320, and 324 can be storage devices such as memory 106 and persistent storage 108 shown in FIG. 1. Although embodiments are described herein with reference to aviation platforms, the methods provided may be practiced in a variety of other environments. For example, the methods described may be applied to generalized cyber-security.

Embodiments described herein provide methods and systems for use in identifying cyber-security threats in aviation platforms. The methods and systems facilitate protecting overall system design and implementation, for e-Enabled aviation platforms and infrastructure, against existing and emerging cyber-security threats in both proactive and reactive manner Furthermore, these systems allow described herein enable additional strengthening of system design and implementation leading to secured designs and infrastructures which lead to lower certification, regulatory, and operational costs.

A technical effect of the system and method described herein includes at least one of: (a) storing parts information relating to each hardware and software component used on the aircraft in an aircraft parts database; (b) receiving, by a computing device, a cyber-security threat; and (c) determining, by the computing device, a threat is relevant to the aircraft by comparing the received threats to the stored parts information.

Although the foregoing description contains many specifics, these should not be construed as limiting the scope of the present disclosure, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention as disclosed herein which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in identifying cyber-security threats for an aircraft, said method comprising:
    storing parts information relating to at least some hardware and software components used on the aircraft, including a map of how each hardware and software component is connected together within the aircraft;
    receiving, by a first computing device, a cyber-security threat;
    determining, based at least in part on the map, a potential path of the cyber-security threat to a targeted system of the aircraft;
    determining a number of components in the potential path between an entry point of the threat and the targeted system; and
    adjusting a threat priority in inverse proportion to the number of components in the potential path.

2. A method in accordance with claim 1, wherein storing parts information further comprises storing at least a safety description and a business description associated with a hardware and software component.

3. A method in accordance with claim 2, further comprising determining at least one of a safety impact and a business impact by comparing the received threat to at least one of the stored safety description and the stored business description.

4. A method in accordance with claim 3, further comprising determining a threat relevancy score based on at least one of the determined safety impact and the determined business impact.

5. A method in accordance with claim 1, further comprising:
    determining that one of the components in the aircraft is affected by the cyber-security threat and that the component is isolated from the other components in the aircraft; and assigning a lower threat priority score to the cyber-security threat than if the component was not isolated.

6. A method in accordance with claim 1, further comprising comparing the threat to a threat tree model in a threat tree database.

7. A method in accordance with claim 1, further comprising analyzing the received cyber-security threat to update at least one of a business description and a safety description.

8. A method in accordance with claim 1, wherein receiving, by a first computing device, a cyber-security threat further comprises receiving a cyber-security threat with at least one of a safety description and a business description associated with the received threat.

9. A method in accordance with claim 1, wherein receiving a cyber-security threat further comprises receiving a cyber-security threat from at least one of Common Vulnerabilities and Exposures List (CVE), National Institute of Standards and Technology (NIST), European Network and Information Security Agency (ENISA), and MITRE.

10. A system for use in identifying cyber-security threats for an aircraft, said system comprising:
   a storage device that stores part information relating to at least some hardware and software components used on the aircraft, including a map of how each hardware and software component is connected together within the aircraft;
   a communications unit configured to receive at least one cyber-security threat; and
   a processor unit coupled to said storage device and said communications unit, wherein said processor unit is programmed to:
   determine, based at least on the map, a potential path of the cyber-security threat to a targeted system of the aircraft;
   determine a number of components in the potential path between an entry point of the threat and the targeted system; and
   adjust a threat priority in inverse proportion to the number of components in the potential path.

11. A system in accordance with claim 10, wherein said processor unit is programmed to determine at least one of a safety impact and a business impact by comparing the received threat to at least one of a safety description and a business description stored in said storage device.

12. A system in accordance with claim 11, wherein said processor unit is further programmed to determine a threat relevancy score based on at least one of the determined safety impact and the determined business impact.

13. A system in accordance with claim 10, wherein said processor unit is further programmed to:
   determine that one of the components in the aircraft is affected by the cyber-security threat and that the component is isolated from the other components in the aircraft; and
   assign a lower threat priority score to the cyber-security threat than if the component was not isolated.

14. A system in accordance with claim 10, wherein said processor unit is further programmed to analyze the received cyber-security threat to update at least one of a business description and a safety description.

15. A system in accordance with claim 10, wherein said communications unit is further configured to receive the cyber-security threat from at least one of Common Vulnerabilities and Exposures List (CVE), National Institute of Standards and Technology (NIST), European Network and Information Security Agency (ENISA), and MITRE.

16. One or more non-transitory computer readable media having computer-executable components, said components comprising:
   a communications component that when executed by at least one processor unit in a first computing device causes the at least one processor unit to:
   receive a cyber-security threat; and
   store part information relating to at least one hardware and software component used on an aircraft, including a map of how each hardware and software component is connected together within the aircraft;
   a threat evaluation component that when executed by the at least one processor unit causes the at least one processor unit to:
   determine, based at least in part on the map, a potential path of the cyber-security threat to a targeted system of the aircraft;
   determine a number of components in the potential path between an entry point of the threat and the targeted system; and
   adjust a threat priority in inverse proportion to the number of components in the potential path.

17. One or more non-transitory computer readable media in accordance with claim 16, wherein said threat determination component further causes the at least one processor to determine at least one of a safety impact and a business impact by comparing the received cyber-security threat to at least one of a safety description and a business description stored by said communications component.

18. One or more non-transitory computer readable media in accordance with claim 17, further comprising a threat relevancy component that when executed by at least one processor unit causes the at least one processor unit to:
   determine a threat relevancy score based on at least one of said determined safety impact and the determined business impact.

19. One or more non-transitory computer readable media in accordance with claim 16, further comprising computer-executable instructions that cause the at least one processor to:
   determine that one of the components in the aircraft is affected by the cyber-security threat and that the component is isolated from the other components in the aircraft; and
   assign a lower threat priority score to the cyber-security threat than if the component was not isolated.

20. One or more non-transitory computer readable media in accordance with claim 16, wherein said threat evaluation component, when executed by the at least one processor unit, further causes the at least one processor unit to:
   analyze the received cyber-security threat to update at least one of a business description and a safety description.

* * * * *